United States Patent
Widmer et al.

(10) Patent No.: US 11,005,343 B2
(45) Date of Patent: May 11, 2021

(54) ELECTRICAL SUB-ASSEMBLY

(71) Applicant: University of Newcastle upon Tyne, Newcastle upon Tyne (GB)

(72) Inventors: James Dumesnil Widmer, Newcastle upon Tyne (GB); Richard Martin, Harrogate (GB); Barrie Charles Mecrow, Ponteland (GB)

(73) Assignee: University of Newcastle Upon Tyne, Tyne and Wear (GB)

( * ) Notice: Subject to any disclaimer, the term of this patent is extended or adjusted under 35 U.S.C. 154(b) by 137 days.

(21) Appl. No.: 16/088,782

(22) PCT Filed: Mar. 28, 2017

(86) PCT No.: PCT/GB2017/050869
§ 371 (c)(1),
(2) Date: Sep. 26, 2018

(87) PCT Pub. No.: WO2017/168139
PCT Pub. Date: Oct. 5, 2017

(65) Prior Publication Data
US 2019/0109517 A1    Apr. 11, 2019

(30) Foreign Application Priority Data
Mar. 30, 2016 (GB) .................................... 1605382

(51) Int. Cl.
*H02K 11/33*   (2016.01)
*H02K 11/04*   (2016.01)
(Continued)

(52) U.S. Cl.
CPC ............... *H02K 11/33* (2016.01); *H02K 3/28* (2013.01); *H02K 3/50* (2013.01); *H02K 9/00* (2013.01);
(Continued)

(58) Field of Classification Search
CPC .... H02K 11/04; H02K 11/049; H02K 11/044; H02K 11/33; H02K 9/00; H02K 19/10; H02K 19/103; H02K 3/28; H02P 25/08
See application file for complete search history.

(56) References Cited

U.S. PATENT DOCUMENTS 4,214,196 A * 7/1980 Boyce ..................... H02P 27/06
                                                        318/510
5,731,689 A * 3/1998 Sato ......................... H02P 9/107
                                                          322/25
(Continued)

FOREIGN PATENT DOCUMENTS

EP      2456054      5/2012
EP      2846441      3/2015
(Continued)

OTHER PUBLICATIONS

Infineon Low VF Schottky Diode Array , Nov. 20, 2007.
(Continued)

*Primary Examiner* — Edgardo San Martin
(74) *Attorney, Agent, or Firm* — Stoel Rives LLP

(57) ABSTRACT

An electrical sub-assembly comprises a stator having a plurality of coils and a cooling means attached to the stator. The electrical sub-assembly further comprises a plurality of pairs of diodes attached to the cooling means, each pair of diodes being in antiparallel configuration and having three electrical terminals. One of the three electrical terminals is a common terminal shared by both diodes in each pair of diodes. A plurality of busbars electrically connect each of the diodes to at least one of the plurality of coils via one or more of the electrical terminals. In use, the cooling means is configured to simultaneously cool the stator and the plurality of diodes. The electrical sub-assembly may have particular application as a part of a switched reluctance machine.

13 Claims, 6 Drawing Sheets

(51) Int. Cl.
*H02K 11/049* (2016.01)
*H02K 9/00* (2006.01)
*H02K 3/28* (2006.01)
*H02P 25/08* (2016.01)
*H02K 19/10* (2006.01)
*H02K 3/50* (2006.01)
*H02K 9/19* (2006.01)
*H02K 37/02* (2006.01)

(52) U.S. Cl.
CPC ............ *H02K 9/19* (2013.01); *H02K 11/044* (2013.01); *H02K 11/049* (2016.01); *H02K 19/103* (2013.01); *H02K 37/02* (2013.01); *H02K 2203/09* (2013.01); *H02P 25/08* (2013.01)

(56) References Cited

U.S. PATENT DOCUMENTS

| | | | | |
|---|---|---|---|---|
| 6,198,183 | B1* | 3/2001 | Baeumel | F04D 25/068 310/52 |
| 6,847,185 | B2* | 1/2005 | Kume | H02P 25/188 318/732 |
| 8,183,817 | B2* | 5/2012 | Higashikawa | H02P 25/20 318/400.21 |
| 9,252,698 | B2* | 2/2016 | Kume | H02P 25/188 |
| 9,318,992 | B2* | 4/2016 | Swamy | H02P 27/16 |
| 9,853,512 | B2* | 12/2017 | Trainer | H02K 1/16 |
| 10,305,345 | B2* | 5/2019 | Nakanishi | H02K 9/19 |
| 2012/0019084 | A1 | 1/2012 | Tsuge | |
| 2012/0126728 | A1* | 5/2012 | El-Refaie | H02K 11/33 318/139 |
| 2012/0262881 | A1* | 10/2012 | Onimaru | B60L 53/14 361/701 |
| 2013/0049495 | A1 | 2/2013 | Matsuo | |
| 2015/0061422 | A1 | 3/2015 | Nagao et al. | |
| 2019/0296605 | A1* | 9/2019 | Okuhata | H02K 7/006 |

FOREIGN PATENT DOCUMENTS

| | | |
|---|---|---|
| JP | H1080183 | 3/1998 |
| JP | 2011015560 | 1/2011 |
| JP | 2011045181 | 3/2011 |
| JP | 2012188201 | 10/2012 |
| RU | 2352048 | 4/2009 |
| WO | 199828833 | 7/1998 |
| WO | 2015072467 | 5/2015 |

OTHER PUBLICATIONS

Infineon Silicon Switching Diode ,Sep. 19, 2007.
Widmer, et al.,Use of a 3 Phase Fill Bridge Converter to Drive a 6 Phase Switched Reluctance Machine, 6th IET International conference on Power Electronics ,Jan. 1, 2012 ,B42.
European Search Report dated Aug. 23, 2019 for EP17715975.3.

* cited by examiner

ELECTRICAL SUB-ASSEMBLY

TECHNICAL FIELD

The invention relates to an electrical sub-assembly. The invention particularly, but not necessarily, relates to an electrical sub-assembly for use in a hybrid electric vehicle or an electric vehicle.

BACKGROUND

Switched reluctance machines (SRMs) are becoming increasingly popular as variable speed drives. Principally, this is because SRMs are simple to build and inexpensive, at least when compared to more commonly used motors. However, SRMs are underutilised for commercial applications, as they typically exhibit high torque ripple and require non-standard asymmetric half bridge converters. FIG. 1 illustrates an embodiment of a recently proposed drive configuration 110 which allows an SRM having six phases A, B, C, D, E, F to be driven by an standard three-phase AC inverter 120. A plurality of diodes 114 having electrical connections 116 are arranged alternatively between the output phases of the power converter 120 to convert the bipolar current waveform output from each phase of the three-phase converter into two unipolar half waveforms, relating to the positive and negative regions of the waveform, respectively. This enables the three-phase inverter 120 to operate as it would for a three-phase electric machine, while supplying a six-phase SRM and having only three power connections 122 between the inverter 120 and the motor. The increased number of phases permits low torque ripple and the diode arrangement allows use of standard full bridge converters. However, further improvements to the proposed drive configuration are required to improve the suitably of SRMs for commercial applications, particularly hybrid electric vehicles (HEVs) and electric vehicle (EVs).

It is an object of embodiments of the invention to at least mitigate one or more of the problems of the prior art.

SUMMARY OF THE INVENTION

According to an aspect of the invention, there is provided an electrical sub-assembly comprising: a stator having a plurality of coils; cooling means attached to the stator; and a plurality of pairs of diodes attached to the cooling means, each pair of diodes being in antiparallel configuration and having three electrical terminals, one of the three electrical terminals being a common terminal shared by both diodes in each pair of diodes, wherein the cooling means is configured to, in use, simultaneously cool the stator and the plurality of diodes. The invention may advantageously enable mounting of the diodes to the cooling means. Additionally, the invention may reduce the number of electrical components, e.g. busbars, required to connect the drive configuration to the coils of the stator.

Preferably, the electrical sub-assembly further comprises a plurality of busbars electrically connecting each of the diodes to at least one of the plurality of coils via one or more of the electrical terminals.

In certain embodiments, one or more of the plurality of pairs of diodes may each be formed as a single electrical component in which a single pair of diodes is packaged.

In certain embodiments, one or more of the plurality of pairs of diodes may together be formed as a single electrical component in which multiple pairs of diodes are packaged.

In certain embodiments, at least two of the plurality of pairs of diodes may be electrically connected to one another by an electrical connection within the single electrical component.

In certain embodiments, the common terminals of the plurality of pairs of diodes may each electrically connected to a respective one of the plurality of busbars. In certain embodiments, n pairs of diodes may be electrically connected to 3n busbars. In certain embodiments, three of pairs of diodes may be electrically connected to nine busbars.

In certain embodiments, two or more of the common terminals of the plurality of pairs of diodes may together be electrically connected to one of the plurality of busbars. In certain embodiments, n pairs of diodes may be electrically connected to 3n–1 busbars. In certain embodiments, three of pairs of diodes may be electrically connected to eight busbars. In certain embodiments, n pairs of diodes may be electrically connected to 3n–2 busbars. In certain embodiments, three of pairs of diodes may be electrically connected to seven busbars.

According to a further aspect of the invention, there is provided an electrical sub-assembly comprising a stator having a plurality of coils; cooling means attached to the stator; a plurality of diodes attached to the cooling means, each of diodes being electrically connected to a respective one of the plurality of coils; and a plurality of busbars, each busbar being electrically connected to one or more of the plurality of diodes and/or one or more of the plurality of coils, wherein the cooling means is configured to, in use, simultaneously cool the stator and the plurality of diodes.

In certain embodiments, the plurality of diodes may comprise at least twelve diodes, the total number of diodes being a multiple of six.

In certain embodiments, the plurality of busbars may comprise a first busbar, a second busbar and a third busbar. In certain embodiments, n/3 of the plurality of diodes and respective coils may electrically connect the first and second busbars, a further n/3 of plurality of diodes and respective coils may electrically connect the first and third busbars, and the remaining n/3 of the plurality of diodes and respective coils may electrically connect the second and third busbars.

In certain embodiments, the plurality of busbars further comprises a fourth busbar. In certain embodiments n/3 of the plurality of diodes and respective coils may electrically connect the first and second busbars, a further n/3 of plurality of diodes and respective coils may electrically connect the third and second busbars, and the remaining n/3 of the plurality of diodes and respective coils may electrically connect the fourth and second busbars.

In certain embodiments, the cooling means comprises a casing. In certain embodiments the cooling means may at least partially surrounds the stator. In certain embodiments, the cooling means may be configured to receive a supply of cooling fluid.

According to a further aspect of the invention, there is provided an electric machine comprising the electrical sub-assembly as described above.

In certain embodiments, the electric machine may be a motor, and optionally the motor has at least six-phases. In certain embodiments, the electric machine may be a generator, and wherein optionally motor has at least six-phases.

According to a further aspect of the invention, there is provided a vehicle comprising an electric machine as described above.

BRIEF DESCRIPTION OF THE DRAWINGS

Embodiments of the invention will now be described by way of example only, with reference to the accompanying figures, in which.

DETAILED DESCRIPTION

Figure 1:
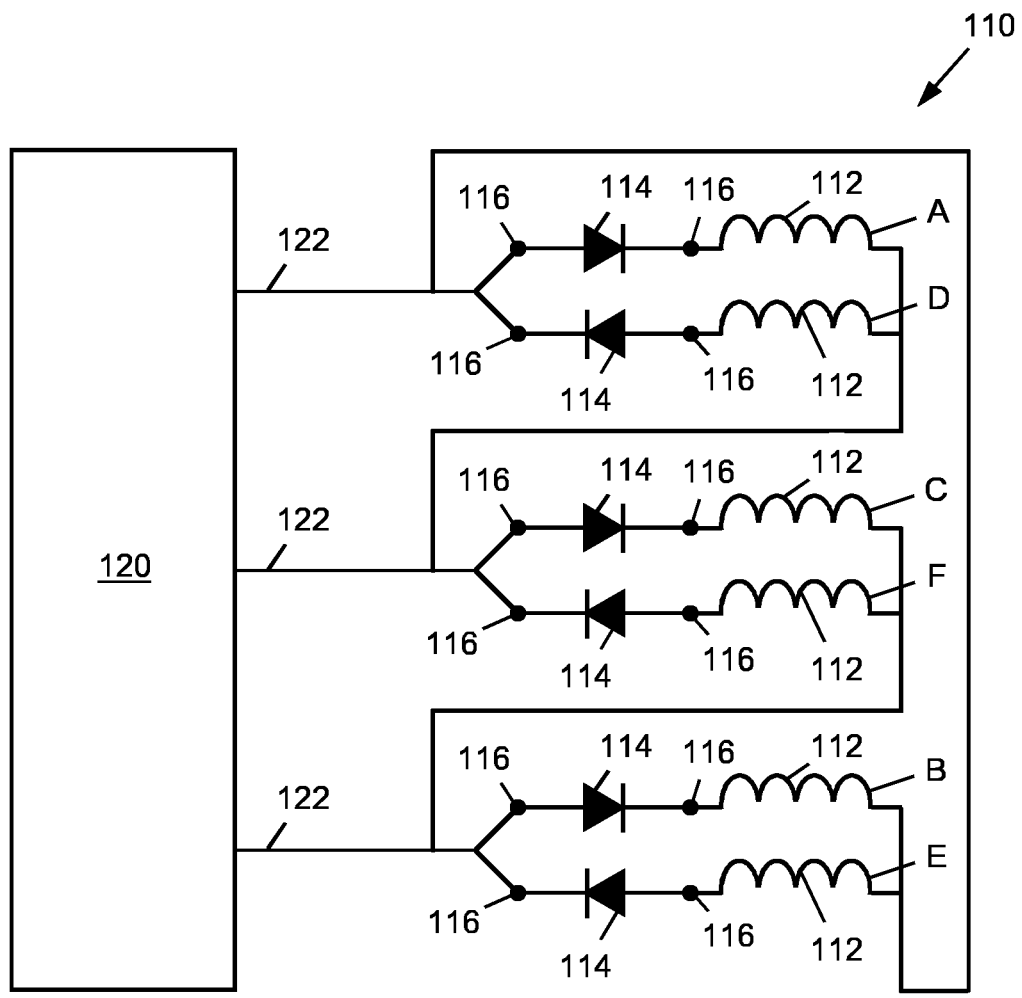
FIG. 1 shows a schematic of a drive configuration for a six-phase SRM according to the prior art.
Figure 2:
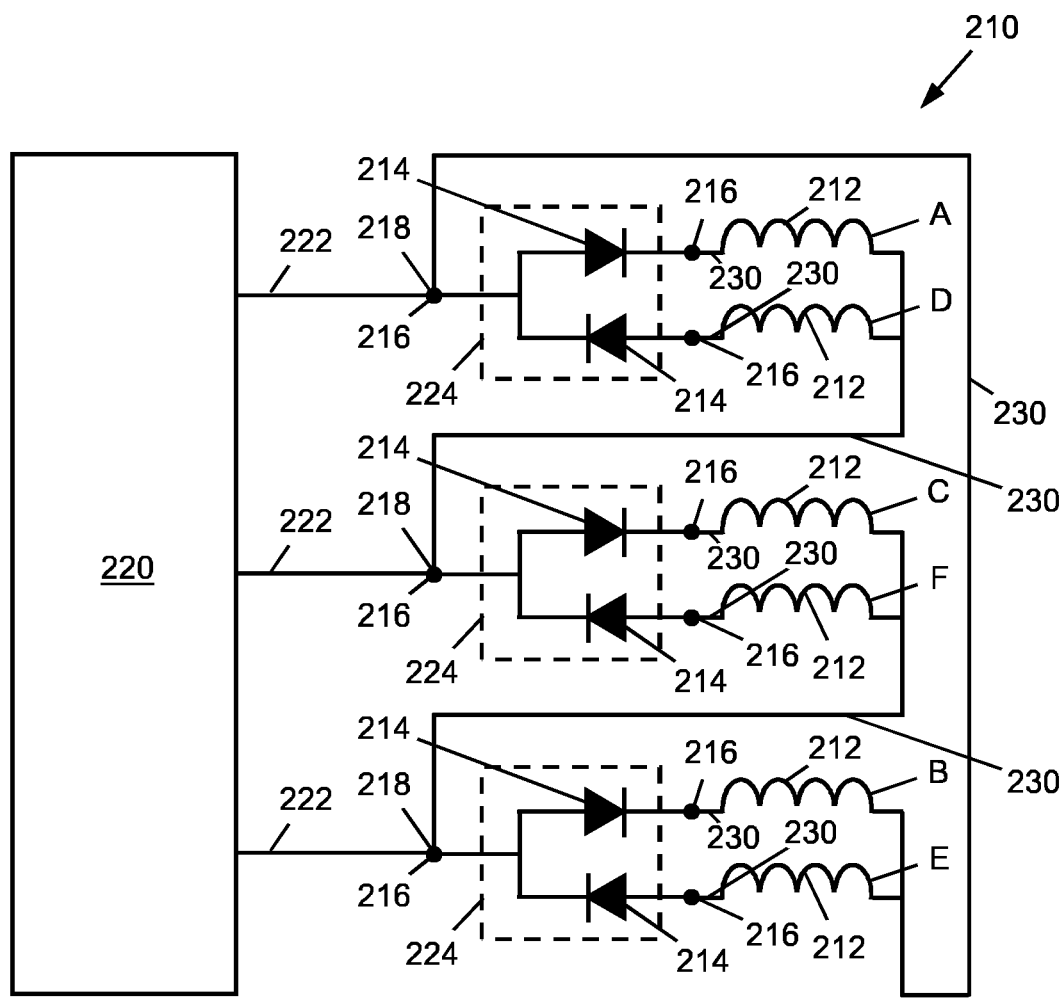
FIG. 2 shows a schematic of a drive configuration for a six-phase SRM according to an embodiment of the invention.

An electrical sub-assembly according to embodiments of the invention will now be described with reference to FIGS. 2 to 5. FIG. 2 shows a schematic of a drive configuration 210 for a six-phase switched reluctance machine (SRM), specifically a switched reluctance motor, having six phases A, B, C, D, E, F. The sub-assembly comprises a stator having a plurality of coils 212 and a cooling means attached, e.g. mounted, to the stator. In certain embodiments, the cooling means may comprise a cooling jacket (which may be referred to as a water jacket). The cooling means may be configured such that, in use, the cooling means cools the stator. In certain embodiments, the cooling means may comprise a casing, a fluid inlet and a fluid outlet. The cooling means may at least partially surround the stator and/or may be a cylindrical casing. In use, a pressurised cooling fluid, e.g. water or oil, may be supplied to the casing through the fluid inlet to circulate through the casing before being discharged therefrom via the fluid outlet. While circulating through the casing, the cooling fluid may absorb heat from the stator, thus cooling stator. In certain embodiments, the cooling means may comprise a Peltier cooler, i.e. a thermoelectric cooler. In certain embodiments, the cooling means may comprise oil cooling applied directly to the coils 212 and the diodes 214, i.e. a flooded motor.

The electrical sub-assembly further comprises a plurality of pairs of diodes 214 attached, e.g. mounted, to the cooling means. In certain embodiments, the electrical sub-assembly may comprise three pairs of diodes 214. The diodes 214 are attached to the cooling means such that, in use, the cooling means is capable of cooling the diodes 214. Therefore, in use, the cooling means may simultaneously cool both the stator and the diodes 214. Each pair of diodes 214 is in antiparallel configuration, i.e. electrically connected in parallel such that electrical current may flow through a pair of diodes 214 in opposing directions by flowing either in a first direction via a first diode 214 in pair of diodes 214 or a second opposing direction via a second diode 214 in pairs of diodes 214. Additionally, each pair of diodes 214 has three electrical terminals 216. Of the three electrical terminals 216 of each pair of diodes 214, one of the three electrical terminals 216 is a common terminal 218 electrically connected to both diodes 214 in a pair of diodes 214, i.e. each common terminal 218 is shared by both diodes 214 in a pair of diodes 214. Accordingly, two of the three electrical terminals 216 of each pair of diodes 214 may be electrically connected to only one of the two diodes 214 in a pair of diodes 214 (although in addition to other components in the drive configuration 210).

The electrical sub-assembly may further comprise a plurality of busbars 230 electrically connecting each of the diodes 214 to at least one of the plurality of coils 212. The electrical connection between the diodes 214 and one or more of the plurality of coils 214 is via a respective electrical terminal 216. Further busbars 230 may connect a number of the plurality of coils to one another. The busbars may take the form of conducting rings attached to the electrical sub-assembly.

The drive configuration 210 may be electrically connected to a power converter 220 having a plurality of output phases. In certain embodiments, the drive configuration 210 may be connected to a three-phase power converter, e.g. a full bridge converter, having three output phases. Power connections 222 may electrically connect the power converter 220 and the drive configuration 210 to one another. Specifically, each of the power connections 222 may electrically connect to a respective one of the plurality of diodes 214. Each of the power connections 222 may correspond to an output phase of the converter 220, thus each of the pairs of diodes 214 may be electrically connected in line with one of the plurality of output phases of the power converter 220. A first pair of diodes 214 may be associated with phases A and D of the SRM and may relate to a first output phase of the power converter 220. A second pair of diodes 214 may be associated with phases B and E of the SRM and may relate to a second output phase of the power converter 220. A third pair of diodes 214 may be associated with phases C and F of the SRM and may relate to a third output phase of the power converter 220. Further busbars 230 may connect one or more of the plurality of coils to one or more of the power connections 222.

Arranged in this manner, the pairs of diodes 214 may convert a bipolar current waveform output from each of the outputs phases of the power converter 220 into two unipolar half waveforms, each relating to a positive region and a negative region of the waveform, respectively. Consequently, the converter power converting 220 having n output phases is able to supply a SRM having 2n phases, while having only n power connections 222 between the power convertor 220 and the drive configuration 210, where n is an integer equal to or greater than one. For example, in embodiments where power converter 220 has three output phases, the power converter is able to supply a SRM having six phases, while having only three power connections 222 between the power convertor 220 and the drive configuration 222.

One or more of the plurality of pairs of diodes 214 may each be formed as a first diode unit 224, i.e. a single electrical component in which a single pair of diodes 214 is packaged. Each of the diode units 224 may comprise the electrical terminals 216 of the diodes 214 packaged therein.

In certain embodiments, the drive configuration 210 may be a delta type configuration, as illustrated in FIG. 2. Referring to the drive configuration 210 illustrated in FIG. 2, the common terminals 216 of the plurality of pairs of diodes 214 may each be electrically connected to a respective one of the plurality of busbars, i.e. for each electrical terminal 216 there is one busbar connecting the diodes 214 to the coils. For example, there may be three pairs of diodes 214, thus nine electrical connections 216 each connected to at least one of nine busbars, respectively. This example is possible using the drive configuration 210 illustrated in FIG. 2.

Figure 3:
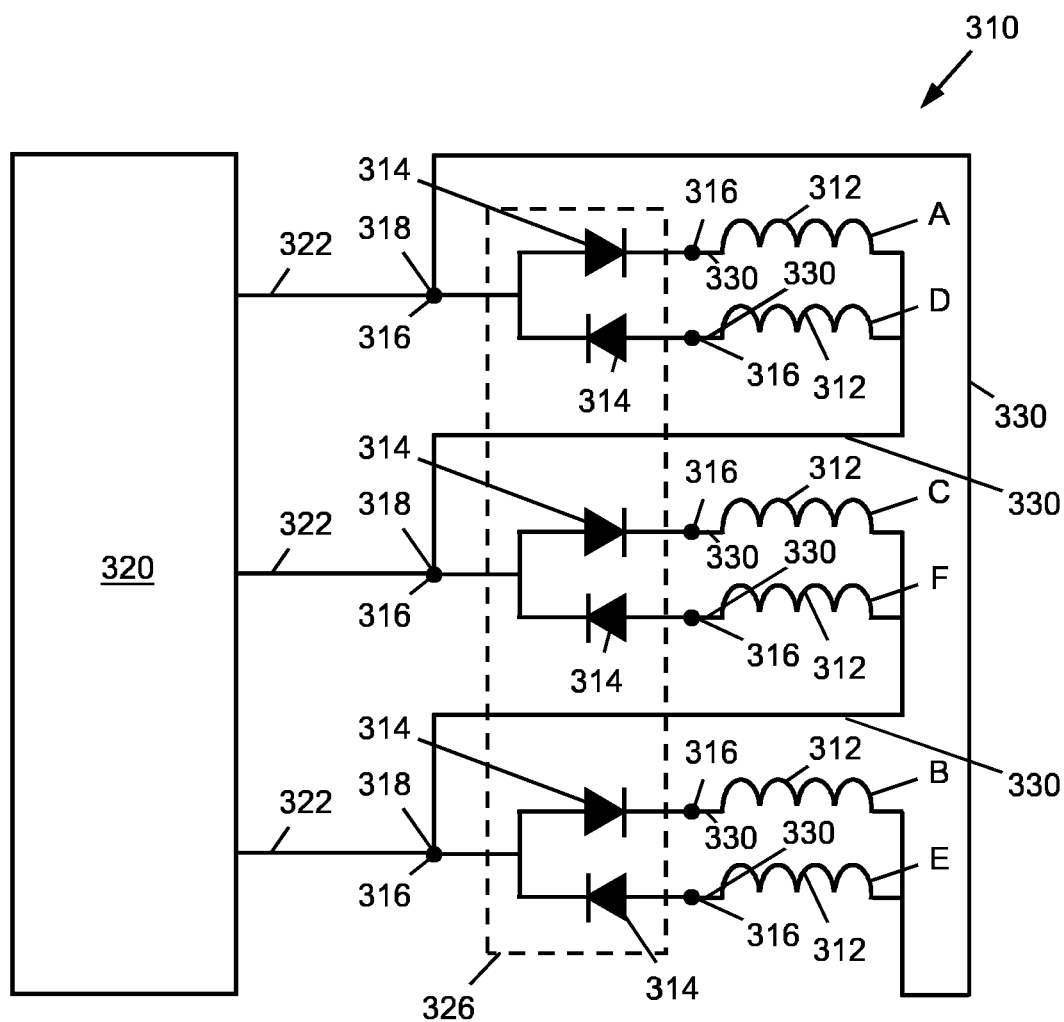
FIG. 3 shows a schematic of a drive configuration for a six-phase SRM according to a further embodiment of the invention.

FIG. 3 shows a schematic of a drive configuration 310 of a further embodiment of the invention, with reference numerals offset by a factor of 100 identifying like features discussed above with reference to FIG. 2. One or more of the plurality of pairs of diodes 314 may together be formed as a second diode unit 326, i.e. a single electrical component in which a multiple pairs of diodes 314 are packaged. In certain embodiments, the second diode unit 326 may comprise a plurality of first diode units 224 (see FIG. 2). The second diode unit 326 may comprise the electrical terminals 316 of the pairs of diodes 314 packaged therein.

Figure 4:
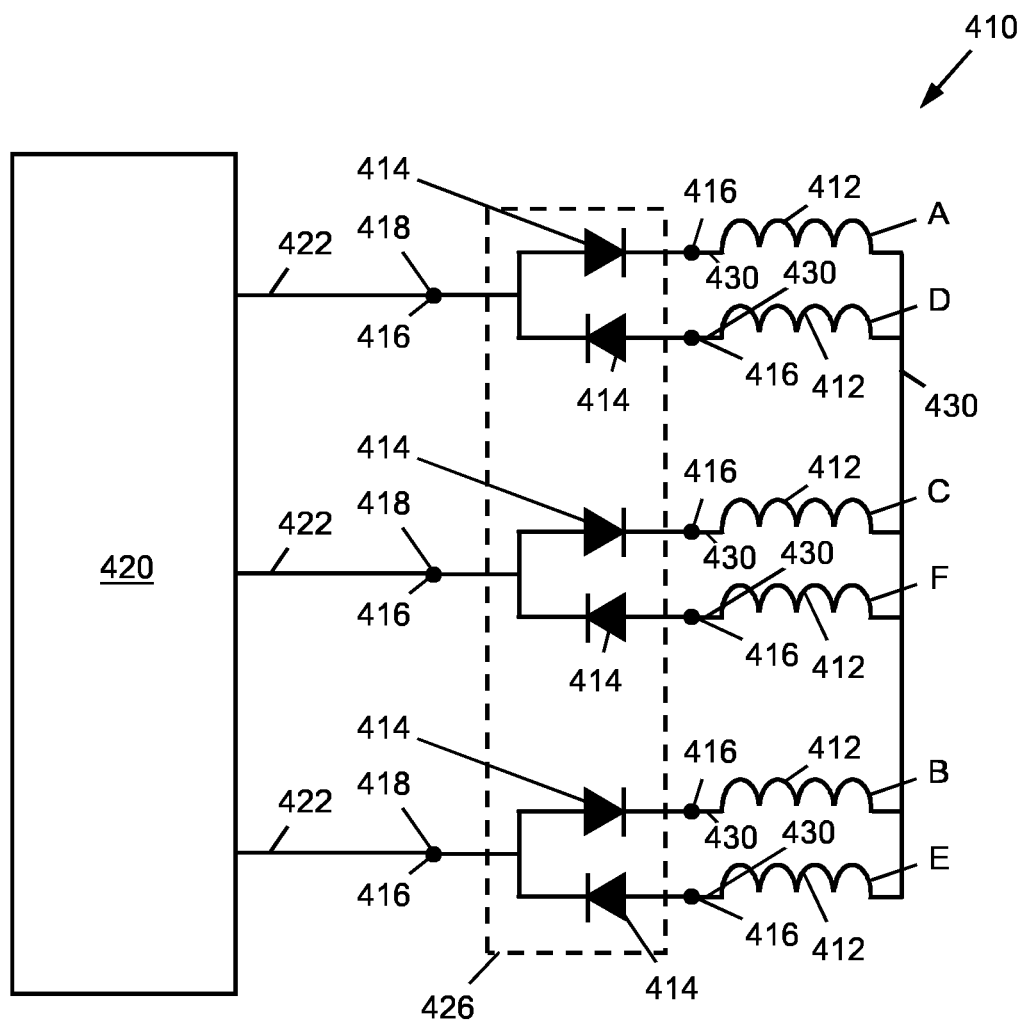
FIG. 4 shows a schematic of a drive configuration for a six-phase SRM according to a further embodiment of the invention.

FIG. 4 shows a schematic of a drive configuration 410 of a further embodiment of the invention, with reference numerals offset by a factor of 200 identifying like features discussed above with reference to FIG. 2. In certain embodiments, the drive configuration 410 may be a star type configuration, as illustrated in FIG. 4. Referring to drive configuration 410 illustrated in FIG. 4, two or more the common terminals 416 of the plurality of pairs of diodes 414 may together be electrically connected to one of the plurality of busbars 430, i.e. two or more the common terminals 416 may be electrically connected to the same busbar 430. Thus, in certain embodiments, there is at least one fewer busbars connecting the diodes 414 to the coils than the number of electrical connections 416. For example, there may be three pairs of diodes 414, thus nine electrical connections 416 connected to seven busbars 430, with the respective three common terminals 418 being connected to one busbar 430. This example is possible using the drive configuration 410 illustrated in FIG. 4.

Figure 5:
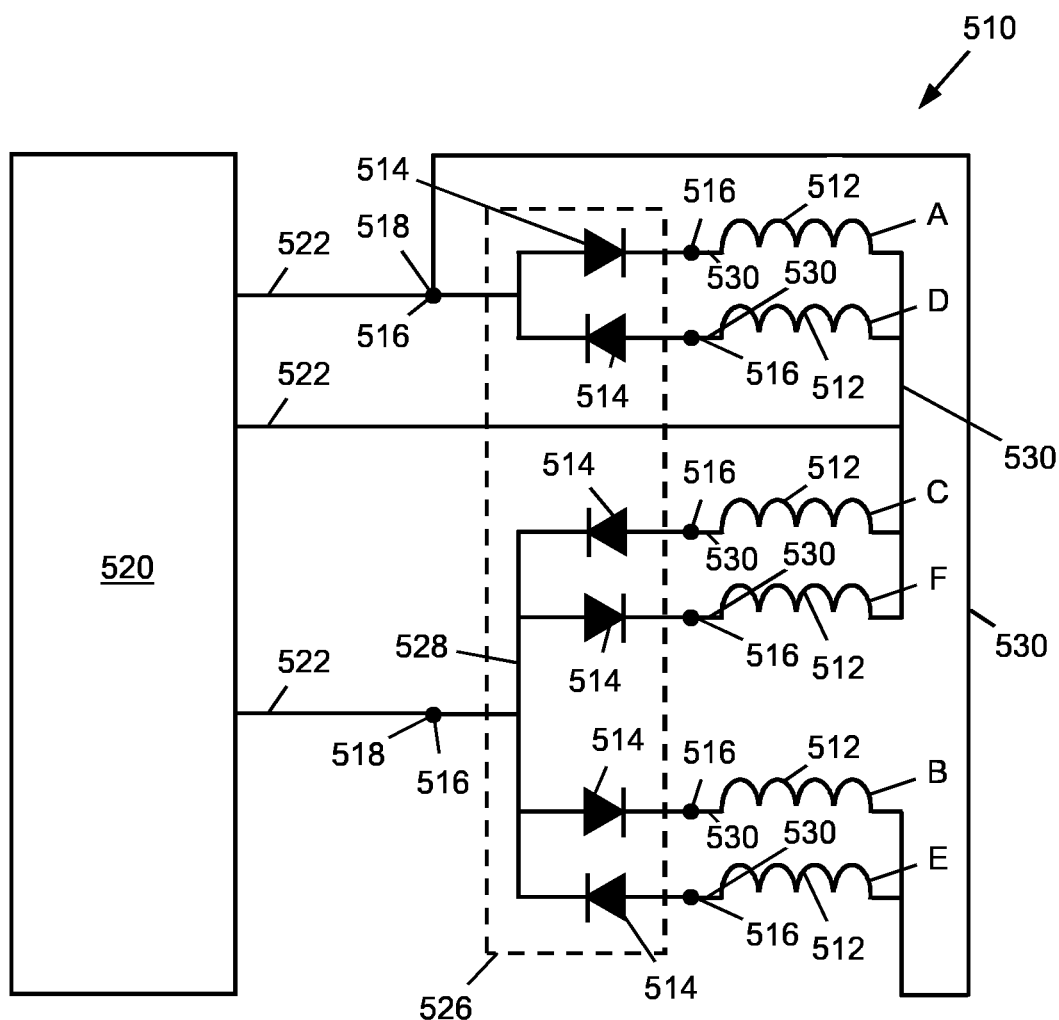
FIG. 5 shows a schematic of a drive configuration for a six-phase SRM according to a further embodiment of the invention.

FIG. 5 shows a schematic of a drive configuration 510 of a further embodiment of the invention, with reference numerals offset by a factor of 300 identifying like features discussed above with reference to FIG. 2. As illustrated in FIG. 5, an internal electrical connection 528 within the second diode unit 426 may electrically connect at least two pairs of diodes 514. Consequently, two pairs of diodes 514 may share a common terminal 518. The internal electrical connection 528 may enable delta type drive configurations, as illustrated in FIG. 5, to have to least one fewer busbars 530 connecting the diodes 514 to the coils than the number of electrical connections 516, i.e. two or more the common terminals 516 may be electrically connected to the same busbar 530. For example, there may be three pairs of diodes 514, thus nine electrical connections 516 connected to seven busbars 530, with the two of the three common terminals 518 being connected to one busbar 530. This example is possible using the drive configuration 510 illustrated in FIG. 5. While star type drive configurations advantageously have no third harmonic currents, delta type connections may be used in preferred embodiments of the invention to minimise diode current rating and diode size and cost.

Figure 6:
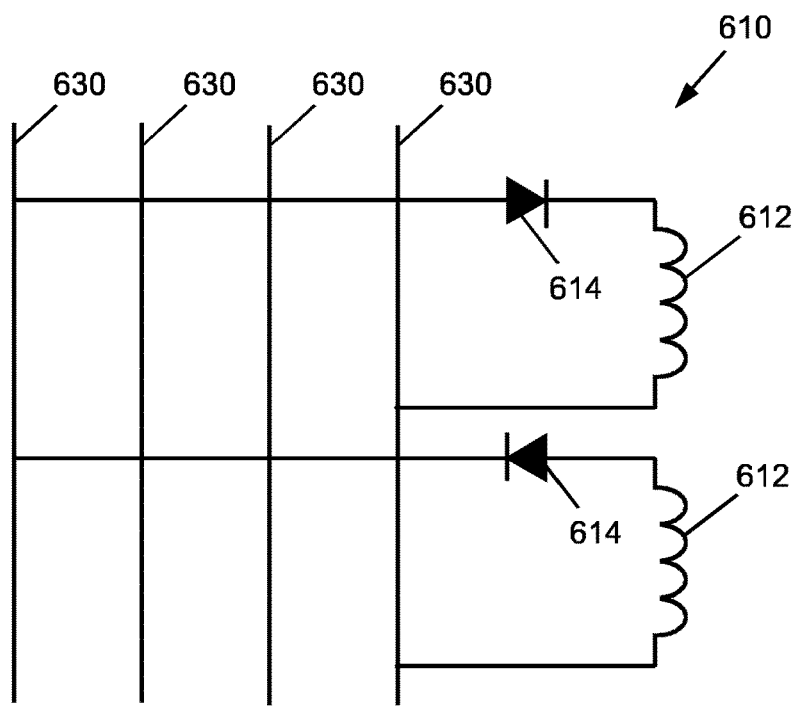
FIG. 6 shows a schematic of a partial drive configuration for a six-phase SRM according to a further embodiment of the invention.

An electrical sub-assembly according to further embodiments of the invention will now be described with reference to FIGS. 6 and 7. FIG. 6 shows a schematic of a partial drive configuration 610 for a six-phase switched reluctance machine (SRM), specifically a switched reluctance motor. The sub-assembly comprises a stator having a plurality of coils 612 and a cooling means attached, e.g. mounted, to the stator. The cooling means may be as described above. The electrical sub-assembly further comprises a plurality of diodes 614 attached, e.g. mounted, to the cooling means. Each of diodes 614 may be electrically connected to a respective one of the plurality of coils 612.

The electrical sub-assembly further comprises a plurality of busbars 630, each busbar being electrically connected to one or more of the plurality of diodes 614 and/or one or more of the plurality of coils 612. As above, the cooling means is configured to, in use, simultaneously cool the stator and the plurality of diodes 614.

While only two diodes 614 and their respective coils 612 are illustrated in FIG. 6, the plurality of diodes 614 may comprise any number of diodes 614 greater than or equal to twelve diodes 614, as long as the total number of diodes 614 is a multiple of six. Referring the drive configuration 610 illustrated in FIG. 6, n/3 of the plurality of diodes 614 and respective coils 612 may electrically connect a first busbar 630 and a second busbar 630 to one another. A further n/3 of plurality of diodes 614 and respective coils 612 may electrically connect a third busbar 630 and the second busbar 630 to one another. The remaining n/3 of the plurality of diodes 614 and respective coils 612 may electrically connect the fourth and second busbars. The drive configuration 610 illustrated in FIG. 6 may be a star type configuration. Half of the plurality of diodes 614 and respective coils 612 connecting one busbar 630 with another may allow electrical current to flow in a first direction, e.g. from the first busbar 630 to the second busbar 630, and the remaining half may allow electrical current to flow in a second opposing direction, e.g. from the second busbar 630 to first busbar 630.

Figure 7:
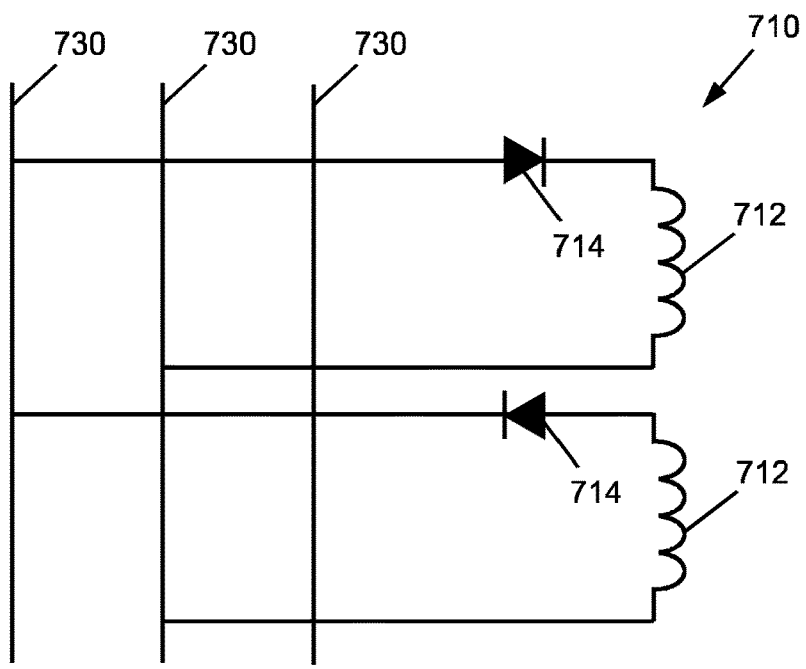
FIG. 7 shows a schematic of a partial drive configuration for a six-phase SRM according to a further embodiment of the invention.

FIG. 7 shows a schematic of a partial drive configuration 710 of a further embodiment of the invention, with reference numerals offset by a factor of 100 identifying like features discussed above with reference to FIG. 6. While only two diodes 714 and their respective coils 712 are illustrated in FIG. 7, the plurality of diodes 714 may comprise any number of diodes 714 greater than or equal to twelve diodes, as long as the total number of diodes 714 is a multiple of six. Referring the drive configuration 710 illustrated in FIG. 7, n/3 of the plurality of diodes 714 and respective coils 715 electrically may connect a first busbar 730 and a second busbar 730 to one another, where n is a integer equal to or greater than twelve and is a multiple of six. A further n/3 of plurality of diodes 714 and respective coils 712 may electrically connect the first busbar 730 and a third busbar 730 to one another. The remaining n/3 of the plurality of diodes 714 and respective coils 712 may electrically connect the second busbar 730 and the third busbar 730 to one another. The drive configuration 610 illustrated in FIG. 7 may be a delta type configuration. As above, Half of the plurality of diodes 714 and respective coils 712 connecting one busbar 730 with another may allow electrical current to flow in a first direction, e.g. from the first busbar 730 to the second busbar 730, and the remaining half may allow electrical current to flow in a second opposing direction, e.g. from the second busbar 730 to the first busbar 730.

In certain embodiments, the electrical sub-assembly has particular application in a traction motor for use in a vehicle, for example a hybrid electric vehicle (HEV) or an electric vehicle (EV). Certain embodiments of the invention enable mounting of the diodes to the cooling means. Certain embodiments of the invention reduce the number of electrical components, e.g. busbars, required to connect the drive configuration to the coils of the stator.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An electrical sub-assembly comprising:
   a stator having a plurality of coils;
   a plurality of pairs of diodes, each pair of diodes being in antiparallel configuration and having three electrical terminals, one of the three electrical terminals being a common terminal shared by both diodes in each pair of diodes; and
   a plurality of busbars electrically connecting each of the diodes to at least one of the plurality of coils via one or more of the electrical terminals.

2. An electrical sub-assembly according to claim 1, wherein one or more of the plurality of pairs of diodes are each formed as a single electrical component in which a single pair of diodes is packaged.

3. An electrical sub-assembly according to claim 1, wherein one or more of the plurality of pairs of diodes are together formed as a single electrical component in which multiple pairs of diodes are packaged.

4. An electrical sub-assembly according to claim 3, wherein at least two of the plurality of pairs of diodes are electrically connected to one another by an electrical connection within the single electrical component.

5. An electrical sub-assembly according to claim 1, wherein the common terminals of the plurality of pairs of diodes are each electrically connected to a respective one of the plurality of busbars.

6. An electrical sub-assembly according to claim 5, wherein n pairs of diodes are electrically connected to 3n busbars.

7. An electrical sub-assembly according to claim 1, wherein two or more of the common terminals of the plurality of pairs of diodes are together electrically connected to one of the plurality of busbars.

8. An electrical sub-assembly according to claim 7, wherein n pairs of diodes are electrically connected to 3n−1 busbars.

9. An electrical sub-assembly according to claim 7, wherein n pairs of diodes are electrically connected to 3n−2 busbars.

10. An electrical sub-assembly according to claim 1, wherein the cooling means at least partially surrounds the stator.

11. An electric machine comprising the electrical sub-assembly according to claim 1.

12. A vehicle comprising an electric machine according to claim 11.

13. An electrical sub-assembly according to claim 1, further comprising a cooling means attached to the stator, wherein the plurality of pairs of diodes are attached to the stator and the cooling means is configured to, in use, simultaneously cool the stator and the plurality of diodes.

* * * * *